(12) United States Patent
Rodriguez et al.

(10) Patent No.: US 10,346,462 B2
(45) Date of Patent: Jul. 9, 2019

(54) METADATA MANAGEMENT AND GENERATION USING PERCEPTUAL FEATURES

(71) Applicant: Digimarc Corporation, Beaverton, OR (US)

(72) Inventors: Tony F Rodriguez, Portland, OR (US); Sean Calhoon, Lake Oswego, OR (US); Alastair M Reed, Lake Oswego, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

(21) Appl. No.: 14/617,288

(22) Filed: Feb. 9, 2015

(65) Prior Publication Data

US 2015/0154231 A1    Jun. 4, 2015

Related U.S. Application Data

(63) Continuation of application No. 11/152,685, filed on Jun. 13, 2005, now Pat. No. 8,953,908.

(Continued)

(51) Int. Cl.
*G06F 16/583* (2019.01)
*G06F 16/58* (2019.01)
(Continued)

(52) U.S. Cl.
CPC ............ *G06F 16/583* (2019.01); *G06F 16/51* (2019.01); *G06F 16/58* (2019.01); *G06T 1/0021* (2013.01);
(Continued)

(58) Field of Classification Search
CPC .......... G06F 17/30265–30268; G06F 17/3028; G06F 21/10; G06F 21/16;
(Continued)

(56) References Cited

U.S. PATENT DOCUMENTS 6,311,214 B1 * 10/2001 Rhoads ............. G06F 17/30876
380/255
2002/0060703 A1 * 5/2002 Tsukada ................. G06K 15/00
347/5

(Continued)

OTHER PUBLICATIONS

Indyk et al. "Finding pirated video sequences on the Internet", Paper No. 199, Stanford Infolab Technical Report, Feb. 1999, pp. 1-24.*

*Primary Examiner* — Kevin Bechtel
(74) *Attorney, Agent, or Firm* — Foley & Lardner LLP

(57) ABSTRACT

The present invention provides methods and systems to improve network searching for watermarked content. In some implementations we employ keyword searching to narrow the universe of possible URL candidates. A resulting URL list is searched for digital watermarking. A system is provided to allow customer input. For example, a customer enters keywords or network locations. The keywords or network locations are provided to a watermark-enabled web browser which accesses locations associated with the keywords or network locations. Some implementations of the present invention employ a plurality of distributed watermark-enabled web browsers. Other aspects of the invention provide methods and system to facilitate desktop searching and automated metadata gathering and generating. In one implementation a digital watermark is used to determine whether metadata associated with an image or audio file is current or fresh. The metadata is updated when it is out of date. Watermarks can also be used to link to or facilitate so-called on-line "blogs" (or online conversations).

18 Claims, 5 Drawing Sheets

Related U.S. Application Data

(60) Provisional application No. 60/582,280, filed on Jun. 22, 2004, provisional application No. 60/656,642, filed on Feb. 25, 2005, provisional application No. 60/673,022, filed on Apr. 19, 2005.

(51) Int. Cl.
*G06F 16/51* (2019.01)
*G06T 1/00* (2006.01)
*H04N 1/32* (2006.01)

(52) U.S. Cl.
CPC ..... *H04N 1/32149* (2013.01); *H04N 1/32352* (2013.01)

(58) Field of Classification Search
CPC ..... G06F 2221/0733; G06F 2221/0737; H04L 63/1408–1425; H04L 2209/608; H04L 2463/103; H04N 1/32149; H04N 1/32352; G06T 1/0021
See application file for complete search history.

(56) References Cited

U.S. PATENT DOCUMENTS

| | | | |
|---|---|---|---|
| 2002/0188841 A1* | 12/2002 | Jones | G06F 17/30876 713/153 |
| 2003/0037010 A1* | 2/2003 | Schmelzer | G06F 17/30026 705/67 |
| 2004/0128514 A1* | 7/2004 | Rhoads | G06F 17/30017 713/176 |
| 2005/0192982 A1* | 9/2005 | Takahashi | G11B 27/329 |

* cited by examiner

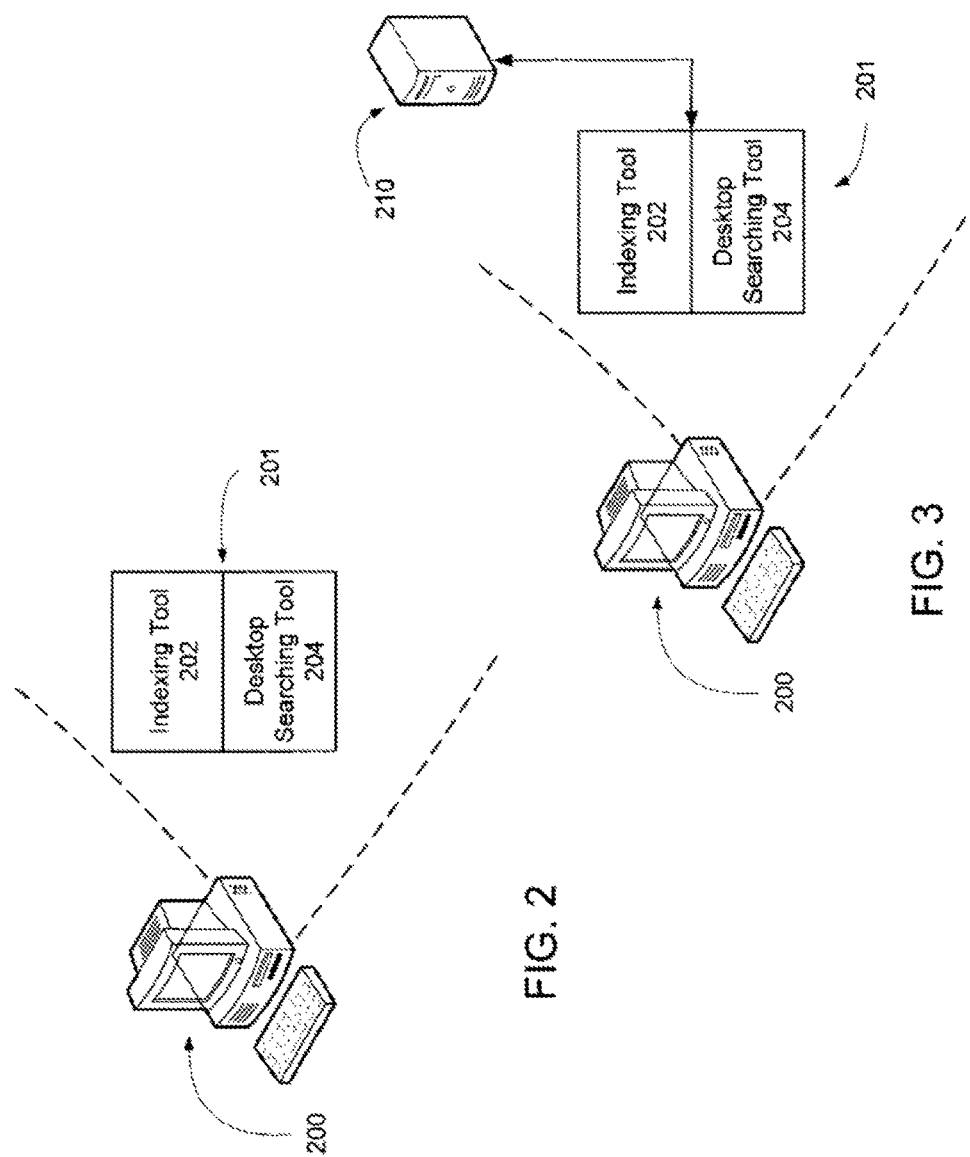

METADATA MANAGEMENT AND GENERATION USING PERCEPTUAL FEATURES

CROSS-REFERENCE TO RELATED PATENT APPLICATIONS

This application is a Continuation of U.S. application Ser. No. 11/152,685, filed Jun. 13, 2005, which claims priority to Provisional Application U.S. Application 60/582,280, filed Jun. 22, 2004; U.S. application Ser. No. 11/152,685 also claims priority to Provisional Application U.S. Application 60/656,642, filed Feb. 25, 2005: and U.S. application Ser. No. 11/152,685 also claims priority to Provisional Application U.S. Application 60/673,022, filed Apr. 19, 2005, all of which are incorporated herein by reference in their entireties.

TECHNICAL FIELD

The present disclosure relates generally to digital watermarking. In some implementations the present invention relates to searching networks or desktops.

BACKGROUND AND SUMMARY

As digital content continues to proliferate, management of digital assets becomes an increasingly difficult challenge. Enhancements in computer networking and database technology allow companies to manage large collections of images and other media and make the content available to third parties. While network communication provides a powerful tool to enable a database manager to share content with others, it makes it more difficult to control and track how the content is being used, and efficiently share the content.

Prior patent documents by the assignee of this patent application describe systems and methods of automated searching and digital watermark screening of media object files on computer networks like the internet. See, e.g., assignee's U.S. Pat. No. 5,862,260, which is hereby incorporated by reference. Software used to perform automated searching and compiling of internet content or links is sometimes referred to as a web crawler or spider.

Digital watermarking is a process for modifying media content to embed a machine-readable code into the data content. The data may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including documents (e.g., through line, word or character shifting, background texturing, etc.), software, multi-dimensional graphics models, and surface textures of objects.

Digital watermarking systems have two primary components: an embedding component that embeds the watermark in the media content, and a reading component that detects and reads the embedded watermark. The embedding component embeds a watermark by altering data samples of the media content in the spatial, temporal or some other domain (e.g., Fourier, Discrete Cosine or Wavelet transform domains). The reading component analyzes target content to detect whether a watermark is present. In applications where the watermark encodes information (e.g., a message), the reader extracts this information from the detected watermark.

The present assignee's work in steganography, data hiding and digital watermarking is reflected, e.g., in U.S. Pat. Nos. 5,862,260, 6,408,082 and 6,614,914; and in published specifications WO 9953428 and WO 0007356 (corresponding to U.S. Pat. Nos. 6,449,377 and 6,345,104). A great many other approaches are familiar to those skilled in the art. The artisan is presumed to be familiar with the full range of literature concerning steganography, data hiding and digital watermarking. The subject matter of the present application is related to that disclosed in U.S. Pat. Nos. 5,862,260, 6,122,403 and in co-pending application Ser. No. 09/571,422 filed May 15, 2000, Ser. No. 09/620,019 filed Jul. 20, 2000, and Ser. No. 09/636,102 filed Aug. 10, 2000; which are hereby incorporated by reference.

As an extension of the watermark-based information retrieval described in U.S. Pat. No. 5,862,260 and marketed by Digimarc Corporation (e.g., under the trade name IMAGEBRIDGE), watermark decoders can be employed in a distributed fashion to perform watermark screening and interacting with watermarked media objects on networks, including the internet. For example, watermark decoders are deployed at a variety of locations on a computer network such as the internet, including in internet search engines that screen media objects gathered by each search engine, network firewalls that screen media objects that are encountered at the firewall, in local area networks and databases where spiders do not typically reach, in content filters, in client-based web-browsers, etc. Each of these distributed decoders acts as a spider thread that logs (and perhaps acts upon) watermark information. Examples of the types of watermark information include identifiers decoded from watermarks in watermarked media objects, media object counts, addresses of the location of the media objects (where they were found), and other context information (e.g., how the object was being used, who was using it, etc.). The spider threads, in turn, send their logs or reports to a central spider program that compiles them and aggregates the information into fields of a searchable database.

But the internet is vast. One challenge is to locate watermarked content throughout the web.

Thus, additional improvements are provided to even further explore the depths of the internet for watermark data.

According to one aspect of the present invention, a method of searching a network for watermarked content is provided. The method includes receiving one or more keywords associated with watermarked content and providing the one or more keywords to a network search engine. A listing of URLs that are associated with the one or more keywords are obtained from the network search engine. The URLs are visited and, while visiting each URL, the content at each URL is analyzed for digital watermarking. At least one watermark identifier and a corresponding URL location are reported when found.

According to another aspect of the present invention, a system to direct network searching for watermarked content is provided. The method includes: i) a website interface to receive at least one of keywords and network locations from a customer; ii) a website interface for communication with a plurality of distributed watermark detectors; iii) a controller to communicate keywords and network locations to distributed watermark detectors; and iv) a database to maintain information associated with digital watermarking and corresponding network locations.

According to still another aspect, a method of searching a network for watermarked content is provided. The method includes receiving a visible pattern and searching the network for content corresponding to the visible pattern. Content identified as corresponding to the visible pattern is analyzed for digital watermarking. At least one watermark identifier and a corresponding URL location are reported when digital watermarking is found.

Another challenge is to find and manage content stored locally on a user's computer or on her networked computers. Searching tools have recently emerged to allow a user to search and catalog files on her computer. Examples are Google's Google Desktop Search and Microsoft's MSN Desktop Search. We provide improvements to ensure that metadata associated with images and audio are current and easily indexable by such desktop searching tools.

Thus, according to yet another aspect of the invention, we provide a method including receiving an imagery or audio file; identifying perceptual features in the imagery or audio file; and based on the perceptual features, generating metadata for the imagery or audio file.

In a related implementation, the method further includes indexing the metadata in a desktop searching index.

In another related implementation, the identifying includes pattern recognition, color analysis or facial recognition.

According to still another aspect of the invention, we provide a desktop searching tool including executable instructions stored in computer memory for execution by electronic processing circuitry. The instructions include instructions to: i. search one or more computer directories for imagery or audio files; ii. upon discovery of an imagery or audio file, analyze the file for a digital watermark embedded therein, and if a digital watermark is embedded therein to recover a plural-bit identifier; iii. obtain metadata from the imagery or audio file; and iv. query a remote database with the plural-bit identifier to determine whether the file metadata is current.

In a related implementation, the desktop searching tool further includes instructions to refresh the file metadata with metadata from the remote database when the file metadata is not current.

According to another aspect of the invention, a method of controlling a desktop searching tool is provided. The method includes searching one or more computer directories for imagery or audio files; upon discovery of an imagery or audio file, analyzing the file to determine whether a digital watermark is embedded therein. And if a digital watermark is embedded therein, then a plural-bit identifier carried by the digital watermark is recovered there from. The method further includes obtaining metadata from the imagery or audio file, and querying a remote database with the plural-bit identifier to determine whether the file metadata is current.

According to still another aspect of the invention, we provide a method to gather metadata associated with imagery or audio. The method includes receiving an imagery or audio file including a content portion and a metadata portion; analyzing the metadata to determine at least one of a time and day when the content portion was created; automatically accessing one or more user software applications to gather information associated with at least one of time and day; and adding the information to the metadata portion.

According to yet another aspect of the invention, a method of obtaining metadata for a first imagery or audio file is provided. The method includes determining other imagery or audio files that were created within a predetermined window of a creation time for the first imagery or audio file; gathering metadata associated with the other imagery or audio files; and associating at least some of the metadata with the first imagery or audio file.

According to another aspect of the invention, we provide a method of authoring metadata for an image or audio file or file directory via a computer. The method includes: providing a graphical user interface through which a user can select a category of metadata from a plurality of categories of metadata; and once selected, applying the selected category of metadata to a file or contents in a directory through a mouse cursor or touch screen, whereby the selected category of metadata is associated with the image or audio file or file directory.

Further aspects, features and advantages will become even more apparent with reference to the following detailed description and accompanying drawing.

BRIEF DESCRIPTION OF THE DRAWINGS

FIG. 2 illustrates a desktop searching tool.

FIG. 3 illustrates a metadata repository that communicates with the desktop searching tool of FIG. 2.

DETAILED DESCRIPTION

Introduction

Figure 1:
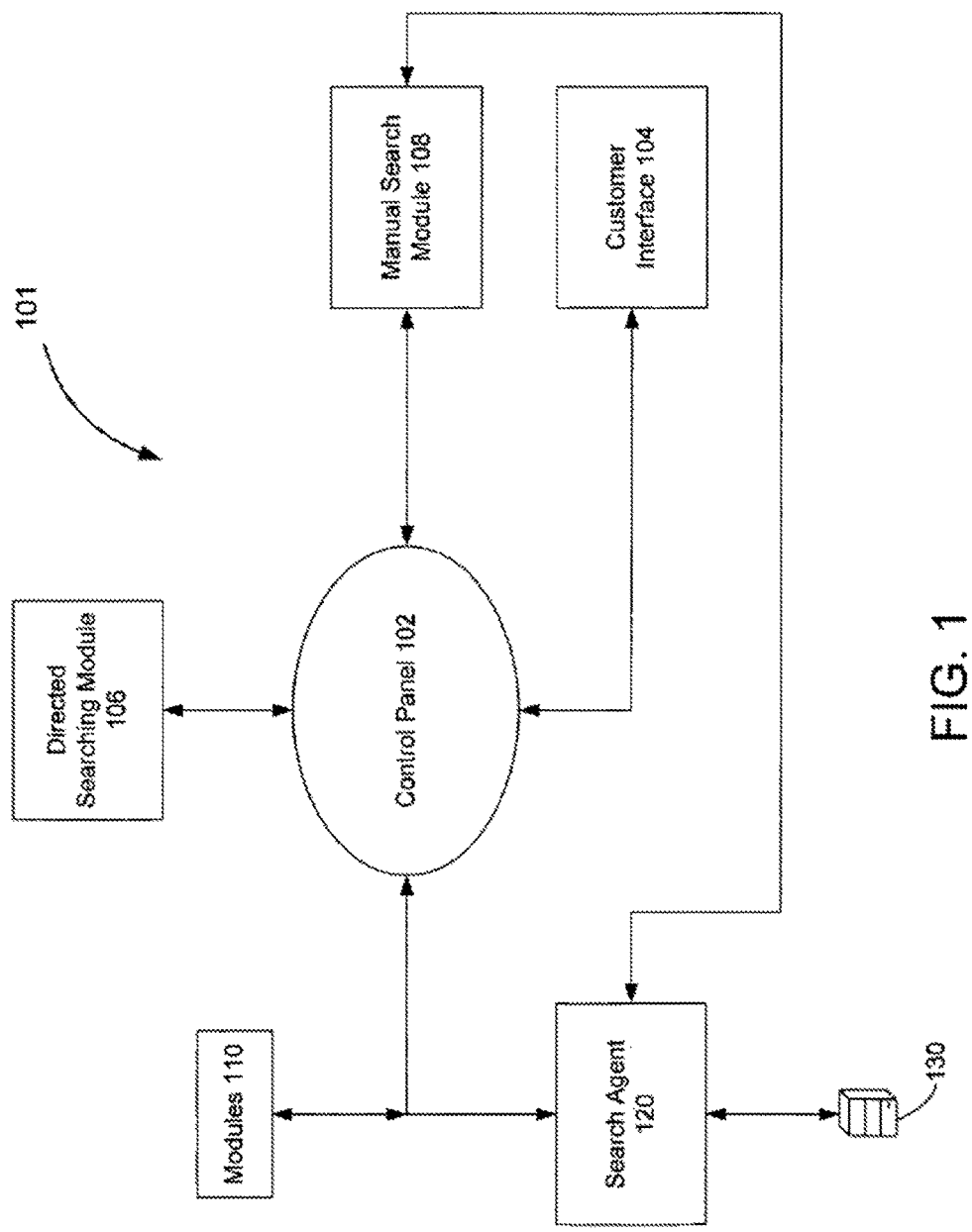
FIG. 1 illustrates a system for enhancing network searching.

The following sections describe systems and processes for content searching, indexing and desktop searching. Some of these employ imperceptibly embedded digital watermarks in combination with other mechanisms for identifying and indexing media content, including still images, video, audio, graphics, and text. Some of the sections describe methods and systems for automatically generating and gathering information, indexing the information in a searchable index and associating the information with media files.

Searching More of the Internet and Integrated Searching Systems

Web searching continues to be a boom for the internet. Examples include Google, Yahoo!, and MSNBC, to name a few. Web searching allows a user to find information that is distributed over the internet. However, current searching systems have two major problems. First, web crawlers that find information for indexing on a search engine only search around 10-20% (a generous estimate) of the internet. Second, a web crawler traditionally only locates surface information, such as HTML (hypertext markup language) web page, and ignores deep information, including downloadable files, FlashMedia and database information.

We are faced with a problem of how to efficiently search the internet. The more internet we search, the higher chance we have of locating watermarked content thereon.

A first solution uses an army of client-based web-browsers to locate watermarked content.

One implementation of this first solution searches content that a user encounters as she routinely surfs the internet. Once identified, watermarked content and a content location can be reported to a central location. The power of this tool emerges as watermark detectors are incorporated into hundreds or thousands (even millions) of browsing tools. Watermarked content—perhaps located behind password protected or restricted websites—is analyzed after a user enters the website, perhaps after entering a user id or password to gain access to a restricted website.

Consider a few additional details. A digital watermark reader is incorporated into (or cooperates with) a user's internet browser or file browser, such as Windows Explorer. Using a web file browser equipped with watermark reader software (e.g., a plug-in, integrated via an Application Programming Interface, or as a shell extension to the operating system), a user browses the internet and/or content files. The digital watermark reader analyzes content encountered through the browser. For example, say a user visits ESPN.com, CNN.com and then looks at images posted on LotsofImages.com. The watermark reader sniffs through the various web pages and web images as the user browses the content. (A watermark reader can also be configured to review web-based audio and video as well.) The digital watermark reader is looking for watermarked content. Upon finding and decoding watermarked content, the reader obtains a watermark identifier. The identifier can be a numeric identifier or may include text or other identifying information. The watermark reader stores (or immediately reports) the identifier and a web location at which the watermark identifier was found. The report can also include a day/timestamp.

When the central server receives a location report, the server can, optionally, verify the existence of the watermarked content by visiting the web location and searching for the watermarked content. Alternatively, the server reports the watermarked content to a registered owner of the content. The owner is identified, e.g., through a database lookup that associates identifiers with their owners. (The owner can then use the report to help enforce copyrights, trademarks or other intellectual property rights.). The central server can also maintain a log—a chain of custody if you will—to evidence that watermarked content (e.g., audio, video, images) was found on a particular day, at a particular web location.

Instead of a watermark reader reporting identified content to a server, the watermark reader can alternatively report the content identifier and location directly to an owner of the watermarked content. In this implementation, a watermark includes or links to information that identifies a content owner. The watermark reader uses this information to properly direct a message (e.g., automated email) to the owner when reporting a watermark identifier and location at which the watermark identifier was found.

A related implementation of our first solution is a bit more passive. A watermark reader is incorporated into a browser (or screen saver). The watermark-reader-equipped browser searches the internet for watermarked content when the computer is idle or otherwise inactive. For example, the browser automatically searches (e.g., visits) websites when a screen saver is activated, or after a predetermined period of computer inactivity.

But which websites does the browser visit?

There are a number of suitable approaches to direct web browsing.

In a first implementation, a browser (or cooperating software) communicates with a central server to obtain a list of websites to visit. The browser caches the list, and accesses the websites listed therein when the computer is inactive. Or, instead of providing a querying browser a list of websites, the server provides the browser with a list of keywords. The keywords are plugged into a search engine, say Google, and the browser then searches resulting websites during periods of computer inactivity. The browser can be configured to accept keywords and automatically access a search engine, where resulting URLs are collected and searched. Or, the central server can hit the search engine, plug in the keywords, and collect the URLs. (Content owners can communicate with the central server, giving it a listing of websites or keywords that the customers would like to have searched.).

Instead of operating during periods of inactivity, a watermark-reader-equipped browser can search as a background process. For example, the browser searches websites while a computer user is frantically pulling together a PowerPoint presentation or typing email. The background process is optionally interrupted when the user clicks the browser icon for web browsing or when the user needs additional computer resources. In fact, one implementation of our invention provides a regulator (e.g., a software module) to monitor activity associated with watermark searching. The regulator automatically scales back watermark searching activity if processing or computer resources reach a predetermined level. (A pop-window can also be presented to a user to allow a user to determine whether to continue watermark searching.)

If a watermark reader encounters a database or flash media (or other content that is difficult to analyze), the watermark reader can report such findings to a central server. The central server can revisit the websites to handle such layered content. For example, the central server may employ algorithms that allow databases or FlashMedia to be explored for watermarked content. One example of a database is an image database. The database is combed, perhaps with a keyword search for file names or metadata, or via a record-by-record search. Each record (or specific records) is then searched for watermarked content.

Targeted Searching

Efficiencies are leveraged when watermark detection is combined with targeted searching.

For example, a content owner (e.g., a copyright owner of prize-winning Beagle images) discovers that her images are being copied from her website and illegally distributed on the internet. Of course, the content owner embeds her images with digital watermarks prior to posting them on her website. The watermarks preferably carry or link to image identifying information, such as the content owner's name, image identifier, data copyright information, etc. The content owner further discovers that her pirated images are often associated with a particular brand of knock-off dog food, "Yumpsterlishious." A targeted search (e.g., via a search engine) for "Yumpsterlishious" and/or "Beagles" generates a listing of, oh say, 1024 URLs. Content from each of the 1024 URLs is then analyzed with a watermark reader to locate unauthorized copies of the content owner's images. The location (e.g., URL) of suspect images can be forwarded to the copyright owner for legal enforcement. Of course, other keywords may include author, photographer, artist, subject matter, dates, etc. The above examples leverage keyword searching (or targeted searching) and digital watermark analysis.

Another targeted search utilizes metadata associated with content. A search engine (or media handlers, like web browsers, media players, etc.) looks for keywords in content metadata (e.g., headers, XML tags, etc.). Content including certain keywords in associated metadata (e.g., to borrow from the above example, "Beagles") is searched with a watermark reader to determine whether it includes a watermark embedded therein. Or metadata associated with an audio or video file is searched for keywords, and if the keywords are found, the file is further analyzed with a digital watermark reader. This example uses keywords in metadata to identify likely candidates for watermark detection.

We can also combine watermark detection with so-called pattern matching. Pattern matching algorithms are well known, and we can employ such algorithms while searching the internet for lexical or image based matches. Watermark decoding is performed only on content meeting predetermined pattern criteria. For example, a pattern matching search is initiated for all images or graphics including a stylistic X, a trademark for Xerloppy Corporation. The pattern matching search turns up 72 hits. The images (or graphic files) are then searched to determine whether a digital watermark embedded therein.

Yet another targeted searching tool leverages network traffic patterns. Routers and switch nodes are monitored to determine internet traffic trends. A watermark-reading web crawler is directed toward the trends. For example, a particular router is monitored to see where traffic originated or is routed from prior to accessing a website including copyrighted (and watermarked) images. The suspected originating or routing websites are crawled in search of watermarked content.

Still another targeted searching method routinely analyzes websites in which unauthorized copyrighted materials have been previously found. For example, a server maintains a listing of websites where watermarked content has been previously found. The websites are routinely crawled in search of any watermarked content.

Integrated Searching System

FIG. 1 illustrates a system 101 implementing an integrated searching strategy. The term "integrated" is used to reflect a system operable to employ both manual and automated searching. One object of system 101 is to identify digital watermarked content on a network, like the internet. The system includes a central control panel or interface 102, through which searching criteria is provided. For example, a customer can enter search terms (e.g., "Beagle") or specific web addresses that she would like searched for watermarked content through, e.g., a web-based customer interface 104. The terms and/or URLs are communicated to interface 102. Interface 102 farms the terms and/or URLs to a watermark detector-enabled web crawler (or searching agent) 120 or to a distributed watermark detector-enabled web crawler (e.g., a soldier from the "army" of web browsers mentioned above). As an alternative, interface 102 provides the terms and/or URLs to directed search module 106, which is a server-based web crawler including a digital watermark detector. The directed search module 106 hits the corresponding URLs in search of watermarked content.

The FIG. 1 system further includes a manual searching module 108 in which an operator directs searching. For example, an operator enters a website to be forwarded to web crawler 120, or directs a web browser to a particular website in search of watermarked content. Or, the module 108 is used to interface with a search engine, e.g., Google, where keywords are entered and resulting URL are provided to watermark detector-enabled web browsers. Of course, interfacing with a search engine can be automated as well.

Interface 102 also preferably interfaces with modules 110 (which may include some human interaction) to assist in digging deeper into websites, e.g., websites including databases and FlashMedia. Modules 110 may also provide the systems with addition URLs to visit. These URLs may be directly provided to web crawler 120, but are preferably controlled by control panel 102.

Results from web crawler 120 (and reports from distributed web crawlers) are provided to a database 130 for customer reports or for further analysis.

Search Engine Categorization

Search engines employ web crawlers to categorize web pages. For example, website text is obtained by a crawler and used to create keyword indexing. Website owners can also register a website by listing the URL and keywords. An improvement is to include a digital watermark analysis in the registration or categorization process. For example, the search engine's web crawler employs a digital watermark reader and scans a target website for digital watermarking. A digital watermark includes a unique identifier, and perhaps text. The identifier and/or text are used as keywords when cataloging the target website. For example, the search engine may associate a web address with a watermark numeric identifier and any text carried by the watermark, and may even indicate that the website includes digital watermarking. The watermark-based keywords are searchable along with any keywords derived from text or HTML found on the website.

As a variation of the above categorization, content can include XML tags. The tags can include a field which indicates that one or more items of content on a website include digital watermarking. The web crawler/search engine need not decode the watermarks; but rather, determines from the XML fields (or header data) that the website includes digital watermarking. The web crawler or associated search engine includes a "watermarking is present" indicator as a keyword associated with the website. Then, a search engine keyword search may include all websites including "watermarking is present," plus any relevant keywords (e.g., "Beagles"). Resulting website listings can be searched for digital watermarking.

Mobile Applications

Another searching tool facilitates communication with a plurality of mobile devices and leverages search results generated by the various mobile devices. Say, for example, that 23-year old Ginger goes clubbing on Saturday night. She finds her way to her favorite hangout and meets up with three of her closest friends. The music is loud and conversation is stifled through the noise and haze. But wireless communication is uninhibited. Ginger—as always—has packed along her wireless device (e.g., Pocket PC, Blackberry, cell phone, etc.). Her device is, e.g., BlueTooth enabled and readily communicates with similar devices carried by Ginger's friends. (Long before, Ginger and her friends established passwords or shared security protocols that enabled secure communication; else anyone standing nearby with a wireless device might be able to sniff contents on their devices.). Ginger's device communicates with the other devices to see whether they have recently performed any searching, and if so, what the nature of the searching was. Ginger can preset search topics (key terms or identifiers) in her wireless device. Instead of presetting search topics, Ginger's wireless device can automatically generate search topics based on Ginger's web browsing history or past internet queries. One setting can be simply to copy any search results carried out by the other devices. Ginger's device uses these preset search topics to sniff other devices and see if they have found anything related to Ginger's search terms.

One friend, Kim, performed a targeted search, yesterday, for music penned and performed in the late 1980's by an obscure Australian rock-band, Aintitnice. The search results (and maybe even corresponding content like audio files) are stored in a search results or shared directory. (The search need not be carried out on Kim's mobile device, but instead, can be carried out on Kim's home computer, with the search results being communicated to Kim's mobile.) Ginger likes Aintitnice also, and has entered the group as a search term in her mobile device. Ginger's wireless device negotiates with Kim's device to obtain the search results and/or even the audio files. (If the audio files are rights protected, Ginger's device can negotiate with an online server to obtain the necessary rights to play the music. For example, the audio file may include a digital watermark that is used to link to the online server.).

Self selection by Ginger (e.g., being friends with Kim and presetting Aintitnice) and proximity (e.g., clubbing with certain friends) enable mobile searching.

A few possible combinations of this mobile device searching include, e.g.:

A1. A method of searching comprising:
from a first mobile device, wirelessly querying a second mobile device to determine whether the second mobile device has internet search results relating to predetermined search criteria; and
receiving at least a subset of the search results.

A2. The method of A1, wherein the first device also queries to determine whether the second mobile device has content related to the predetermined search criteria.

B1. A method of searching comprising:
receiving search criteria in a first, handheld mobile device;
upon sensing of a second, handheld mobile device by the first, handheld mobile device, automatically and wirelessly querying the second, handheld mobile device to determine whether the second, handheld mobile device has any content stored thereon corresponding to the search criteria; and
receiving content corresponding to the search criteria from the second, handheld mobile device.

A few other combinations of the above sections include:

C1. A method of searching a network for watermarked content comprising:
receiving data representing a visible pattern;
searching the network for content corresponding to the visible pattern;
analyzing content identified as corresponding to the visible pattern for digital watermarking;
obtaining at least one watermark identifier from the digital watermarking; and
reporting at least one watermark identifier and a corresponding network location when digital watermarking is found.

C2. The method of C1, wherein the visible pattern comprises a company logo.

C3. A method of searching a network for watermarked content comprising
accessing a remote server to obtain a list of network locations;
searching the network locations for digital watermarking during periods of computer user inactivity;
reporting to the remote server at least one watermark identifier and a corresponding network location when digital watermarking is found.

C4. A method of searching a network for watermarked content comprising:
accessing a remote server to obtain search criteria;
searching the internet for digital watermarking as a background process during periods of computer user activity;
reporting to the remote server at least one watermark identifier and a corresponding network location when digital watermarking is found.

C5. The method of C4, wherein search criteria comprises an instruction to search internet content accessed by the user.

C6. The method of claim C4, wherein the search criteria comprises keywords.

C7. The method of C6, further comprising automatically accessing a network search engine, providing the keywords to the network search engine, and obtaining there from a listing of URLs associated with the keywords, wherein said searching comprises searching the URLs.

C8. A system to direct network searching for watermarked content comprising:
a website interface to receive at least one of keywords and network locations from a customer;
a website interface to communicate with a plurality of distributed watermark detectors;
a controller to control communication of keywords and network locations to the plurality of distributed watermark detectors; and
a database to maintain information associated with digital watermarking and corresponding network locations.

C9. A system to direct network searching for watermarked content comprising:
a website interface to receive at least one of keywords and network locations from a remote customer;
a web browser including or cooperating with a digital watermark detector;
a controller to communicate keywords and network locations to a web browser, wherein the web browser searches locations associated with the keywords or the network locations; and
a database to maintain information associated with digital watermarking and corresponding network locations.

C10. A method comprising:
i. searching one or more device directories for imagery or audio files;
ii. upon discovery of an imagery or audio file, analyzing the file for a digital watermark embedded therein, and if a digital watermark is embedded therein, recovering watermark information there from;
iii. obtaining metadata from the imagery or audio file;
iv. creating a first file including at least some of the watermark information and at least some of the metadata;
v. creating a second file from the first file, wherein the second file includes at least some of the watermark information and at least some of the metadata, and wherein creation of the second file triggers indexing of the second file by a device searching tool.

C11. The method of C10 wherein the first file comprises XML and the second file comprises HTML.

C12. The method of C10 wherein the device comprises at least one of a cell phone, portable music player, game console and computer.

C13. The method of C10 wherein said creating employs at least a style sheet.

Desktop Searching

Another aspect of the invention is a desktop searching tool that provides efficient media (e.g., audio, images and video) searching and cataloging. The tool can also provide metadata refreshing capabilities as well.

We start with a searching tool 201 (e.g., a software program or application) that resides on a user's computer 200 (FIG. 2). The searching tool includes two primary software components—an indexing tool 202 and desktop searching tool 204. Of course, tools 202 and 204 need not be separate components or software application, but are referred to separately here to ease discussion of their individual functions. The software can be written in any language available to software programmers such as C, C++, Visual Basic, Java, Python, Tcl, Perl, Scheme, Smalltalk and Ruby, etc.

The indexing tool 202 combs through the user computer (or home network) in search of image, audio or video files. The indexing tool 202 catalogs its findings in one or more indices (e.g., it creates an index). An "index" contains a searchable listing or collection of words, numbers and characters and their associated files and locations. A user then searches an index—instead of the entire computer—when she wants to find a file including a keyword. The search is carried out with Desktop Searching Tool 204. We mention here that we sometimes refer to both image and video files as "imagery." Our use of the term "imagery" is also broad enough to cover multimedia files as well.

The desktop searching tool 204 provides a user interface (e.g., desktop window or HTML based interface) through which a user queries an index to find specific imagery or audio files or metadata associated therewith. Imagery or audio files are typically defined by a content portion and a metadata portion.

A user is preferably able to select storage areas to search and catalog by the searching tool 201, e.g., C drive, certain files or directories, and/or removable media (zip drive, external hard drive, DVD drive, attached MP3 player or jump drive (flash memory, USB drive), etc). Of course, the user could select her entire computer or home network. The searching tool 201 can be preferably placed in a background searching mode.

When operating in a background searching mode, the searching tool 202 searches the computer while a user works on other applications (e.g., akin to common anti-virus software that routinely looks at all incoming files). This background mode preferably filters new files as they are created or received by the user's computer or home network.

To simplify the discussion going forward we'll focus on imagery files. But the reader should not presume that our inventive techniques are limited to just image or imagery files. Instead our techniques also apply to audio and rich content (e.g., MacroMedia flash files), etc.

Our indexing tool searches for image files, e.g., as identified by their file extensions *.gif, *.jpg, *.bmp, *.tif, etc. (If searching for audio or video files, we might search for *.au, *.wmv, *.mpg, *.aac, *.mp3, *.swf, etc.)

An image is indexed once it is located. To do so the image is opened sufficiently (e.g., perhaps without accessed any compressed image portion) to access a metadata portion, if any. The metadata can be provided for inclusion in a searchable index. For example, consider an image named "Falls.jpg," with metadata including a descriptive phrase: "Picture of Falls taken near Silver Lake, Mont." The file name and the descriptive phrase are added to the desktop search index, along with the file location and any other metadata in the descriptive phrase.

This first implementation works best when the searching tool 201 cooperates with a desktop searching index (e.g., MSN Desktop Search) through an application program interface. For example, when the Desktop Search encounters an image file it calls searching tool 201, or passes the image file or file location to searching tool 201. In some alternatives, we use image searching software from IFilterShop LLC (available on-line at www.ifiltershop.com) as a component of indexing tool 202. The IFilterShop software would help to search images for metadata associated therewith. Such metadata is added to an index to be searched by a desktop searching tool 204.

In a second implementation, indexing tool 202 creates an HTML file (or XML, Word, or other text searchable file) for each image file searched. The HTML file is preferably stored in the same directory as the image file, or in a directory that is accessible to a searching tool. The HTML file includes the image file name ("Falls.jpg") and a listing of any terms ("Picture of Falls take near Silver Lake, Mont.") and other metadata (time, date taken, camera parameters, geo-coordinates, etc.). The HTML file preferably includes a similar name, but with a different extension (e.g., "Falls.dwm-.html"). We can optionally include (or associate) a thumbnail representation of the JPEP image in the HTML file as well.

The HTML file is searchable. For example, indexing tool 202 (or the Google and MSN desktop searching tools) are able to search the HTML file for metadata (e.g., text), and once found, the searching tools add the metadata to their, desktop index.

Digital Watermarks

In both the first and second implementations of the previously discussed desktop searching an image file is preferably searched for an embedded digital watermark. That is the indexing tool 202 includes or cooperates with a digital watermark detector. If found, the HTML file is provided with a watermarking indicator (e.g., text, number or graphical indicator) to show that the image file is watermarked and what information is carried by the watermark (e.g., a plural-bit identifier or message).

Thus, a digital watermark—embedded in an image—becomes searchable by a desktop searching tool.

If a watermark is not found in an image, one can be embedded therein if desired.

A watermark can also be used as "the" identifier to link between an image and an on-line metadata repository as further explored below.

Watermark-Based Refreshing

In U.S. patent application Ser. No. 09/482,786, filed Jan. 13, 2000, and in its parent applications, we refer to a metadata repository and using a steganographic identifier to access the metadata repository.

Related implementations are now provided.

We start with the premise that metadata will—inevitably—become disassociated with its underlying content. Scaling, cropping, editing, transforming and transmitting content increases the chances of separating metadata from its content.

A digital watermark provides the persistent link between metadata and content.

One aspect of our invention is a metadata "refresh" or synchronization. Desktop searching tool 201—as part of the indexing process—checks with a metadata repository to ensure that metadata associated with an image is current or up to date. (As will be appreciated, these refreshing or synchronization techniques can also be extended to internet searching tools, like Google and Yahoo!, as well. A search engine, after or part of a search, can ask a searcher whether they would like to populate metadata for a particular image, audio or video found. The methods and systems detailed below can be used for such populating.)

In particular, the desktop searching tool 201 queries a metadata repository 210 (FIG. 3) to see if there is any metadata associated with an encountered image.

The repository 210 can be stored locally on the user's computer 200, but more likely the repository 210 is accessed over a network (e.g., internet or cellular network).

If an encountered image includes a digital watermark identifier embedded therein, the watermark identifier is communicated to the metadata repository 210. The identifier is used to index into the repository 210 and locate any information associated therewith. The information is communicated to the searching tool 201 for indexing. The information stored in the repository is checked against the image metadata. If the repository information is the most current or up to date, it is accessed and indexed (and perhaps stored or associated with the image on the user's computer). If, however, the image includes the most up to date metadata, the image metadata is preferably copied to the metadata repository and cataloged according to the watermark identifier. Relative metadata "freshness" can be determined, e.g., by a metadata timestamp or even a "last updated" file indicator. Or if no file metadata is found (another case of unfreshness), metadata from the repository is provided for indexing and associated with the image file.

Since a user is not so trusting, to simply except new metadata or fresh content, a hash or other reduced-bit identifier can be used to verify the veracity of content and metadata. For example, say a header indicates the underlying content is a song by the Eagles. The header can include a hash of the song to allow verification of the contents and header information. The hash is provided to a trusted third-party repository along with the metadata. The hash is authenticated and the metadata (and song) are then deemed trustworthy.

The searching tool 201 can periodically check with the metadata repository 210 to ensure that the image metadata (and index of such metadata) is up to date. A graphical user interface may also provide a selectable button, allowing a user to select a feature to continuously (or frequently) query the metadata repository 210 to ensure metadata freshness.

As an alternative implementation, the searching tool 201 inquires whether an encountered image itself is stored in repository 210. If not, the searching tool provides a copy of the image to the repository 210. Then, both the metadata and image are stored in the repository 210. A search index can be updated to reflect that the image itself has been stored in the repository 210. (In some cases the image is removed from the user's computer when it is copied to the repository). An image registration can be automatically carried out by the searching tool 201. For example, the registration may include association of the image to the user's account or assignment of a unique identifier (e.g., via a digital watermark, fingerprint or hash).

Consider some additional watermark-based metadata gathering examples.

A fledging photographer takes a memory card full of pictures while vacationing at Disneyland. Prior to taking her trip, the photographer programmed her camera (maybe which is incorporated into a cell phone) to watermark some or all pictures taken by the camera with the same identifier. The identifier is associated in the data repository 210 with key words or information (e.g., vacation dates, location, family members on the trip, on-line journal, etc.). Our searching tool 201, once it encounters the watermark identifier in a Disneyland picture, queries the data repository 210 with the identifier in search of additional metadata. The key words or information are retrieved from the data repository 210 and indexed for desktop searching. Thus, the identifier is used to generate additional metadata. The metadata can also be indexed in a searchable index.

Now suppose that the repository 210 is a public repository. The young photographer selects an identifier that is generally associated with Disneyland. That is, the photographer selects an identifier that people generally use when vacationing at Disneyland. The public then populates data records associated with the identifier (e.g., people post Disneyland favorite memories, directions, Mickey Mouse facts, etc.). The searching tool 201, once it encounters the watermark identifier in a Disneyland picture, queries the data repository 210 with the identifier in search of additional metadata. The data records are retrieved and indexed for desktop searching. (Of course, instead of a public identifier, a semi-public identifier can be provided. For example, all members attending a family reunion can use the same identifier. Use of the term "same" includes a situation where a watermark has many payload fields, and the "same" identifier is included in a predetermined field. In this multi-payload field situation, two watermarks may include the same identifier but have different information stored in different fields.)

Metadata Gathering

Metadata can be gathered using other techniques as well. For example, a location of an image can be inferred from related clues. An image file named "DisneyLand001" was probably taken at Disneyland. The word Disneyland is provided to an internet search engine or data repository to gather metadata. The metadata is provided to a desktop searching tool which updates the image file's metadata portion and indexes the new metadata in a searchable desktop index.

A directory structure name and/or date and time information can be used to gather metadata. For example, if searching tool 201 knows (e.g., from a metadata field or watermark date/time stamp) that a picture was taken on Feb. 14, 2005 at 8:30 pm, the searching tool can use this information to gather related metadata. Perhaps the searching tool queries the photographer's Outlook calendar or other calendaring software to see what was scheduled at that time ("Valentine's Day dinner at Jake's with Jane"). This information is provided for indexing by the desktop searching tool 201. Not only is this information provided for indexing, the information can be associated as metadata in the image file.

Or, if a user keeps an electronic journal or diary, a certain date within the journal or diary can be similarly queried. For example, words or terms within a journal entry are extracted, indexed and then stored as metadata. Still further, the searching tool can access financial or checkbook software (e.g., Microsoft Money or on-line bank statements) to check receipts or entries around this time. (Interfacing with Outlook, MS Money, Word and Excel is straightforward to those skilled in the art given the public information about such programs and their interfaces. For example, Outlook can be accessed using Automation techniques from just about any program written with Microsoft Visual Basic. Other techniques use application program interfaces, etc.).

A desktop searching tool 201 may also use an audit trail to gather metadata. Suppose, for example, that a user receives a picture emailed from her brother Scott. The email trail (from whom and when received) can be used as metadata for the picture. (Recall from the discussion above that all files can be searched when received. For example, the indexing tool 202 recognizes that a new image is received in an Outlook Inbox. The email history and image are combed by the indexing tool 202 to gather this information.).

An internet history or cache is also looked at. For example, search terms entered into an internet search engine are pulled from the Browser's history or are cached and used as metadata for an image found from the search.

Many of today's cameras are equipped with GPS units. GPS data generated by these units can be stored in header or watermark information. Searching tool 201 uses the GPS data to locate related metadata. For example, GPS coordinates are extracted from an image and are provided to a geographical database. The coordinates are used to index the database and find metadata associated with the geolocation. The metadata can include a city name, historical information, current weather, building specification, associated pictures, etc.

We can also gather metadata from general "inferences" made about an image. For example, we can look at metadata in adjacent pictures. Consider, for example, a directory that includes three pictures: photo 1, photo 2 and photo 3. When gathering metadata for photo 2, searching tool 201 looks at metadata associated with photo 1 and photo 3 to supplement the metadata for photo 2. Chances are that the photographs were taken at or about the same time or at or around the same location. Similarly, timestamps are used to determine images that were taken near one another—like within a 5 or 10 minute window. Chances are that images within such a timeframe are related. This window can be expanded depending on user preference (e.g., expanded to 7 days to cover a Disneyland vacation). Metadata associated with these images is used by the searching tool 201 or associated with a target image.

GPS data and timestamps can be used to generate even further information. For example, a sports enthusiast snaps a few pictures while attending the NCCA men's basketball semi-finals in Dallas. GPS coordinates and a timestamp are associated with the pictures (e.g., as an embedded watermark or header information). The GPS is used to identify the location (e.g., sports arena) and the timestamp is used to identify an event at the sports arena (basketball game). These terms can be used as search terms to identify additional metadata, stories, scores, etc. associated with the event. This information is provided for association with the images.

Metadata Generation

We can also automatically generate metadata for an image.

Consider a cell phone that has a biometric sensor (e.g., a fingerprint scanner). (For example, LG Telecom, one of the largest wireless network operators in Korea, recently launched a biometric cell phone—the LP3800. Other manufacturers are providing competing cell phones.) A user presents her finger for scanning by the cell phone. The user is identified via the fingerprint. A searching tool 201 uses this fingerprint identifier as photographer metadata. (For example the searching tool 201 can query (e.g. via a wireless or Bluetooth sniff) the cell phone and inquire who the photographer was when the photo was taken. The photo is identified to the cell phone camera by file name or other identifier. Or, if a photographer identifier is included in a photograph's metadata, the searching tool 201 queries the cell phone to see who the identifier corresponds with. If the biometric identifier has been encountered before, the searching tool can use past cell phone inquiry result instead of talking with the cell phone. Of course a human fingerprint (or template there from) can be used as metadata itself.

Search tool 201 may also include or cooperate with a pattern recognition or color analysis module. Metadata is generated through image pattern recognition. For example, the searching tool 201 analyzes an image with a pattern recognition module. The results of which are used as metadata. (For example, the pattern recognition module might return the term "tree" after analyzing a picture of a tree.). We can also perform a color analysis of an image, e.g., calculating a 3-D color space histogram of the image. The histogram identifies predominate colors (e.g., red, pink, yellow, etc.). Predominate colors can be based on an image region or a percentage of an image including the predominate color. Or only the top three or so colors are indexed for a particular image. One can imagine a search request typed or spoken into desktop searching tool 204 requesting a picture of grandma wearing her pink hat. The query may specifically include the terms "grandma" and "pink". The term "pink" identifies those pictures having pink as a predominate color as automatically determined from such color analysis. This subset is cross-check with all pictures including grandma as metadata. The resulting set of pictures is identified for user perusal.

Other metadata can be inferred from image characteristics. A "dark" picture (as determined by a color or pixel analysis) might imply that the picture was taken at night or indoors.

Instead of pattern recognition or digital watermarking, searching tool 201 may include or cooperate with a fingerprinting module. We use the term "fingerprint" to mean a reduced-bit representation of an image like an image hash. The terms "fingerprint" and "hash" are sometime interchangeably used. A fingerprint is generated and is then used to query a database where other images have been fingerprinted. For example, different pictures of the Empire State Building yield similar (or related) fingerprints. These pictures and their corresponding fingerprints are indexed in the database. While exact matches might not be frequently found, those fingerprints that are deemed statistically relevant are returned as possible matches. Metadata associated with these fingerprints can be returned as well. (Fingerprinting and watermarking can also be advantageously combined. For example, a digital watermark can be used as a persistent link to metadata, while a fingerprint can be used for identification.)

Figure 4:
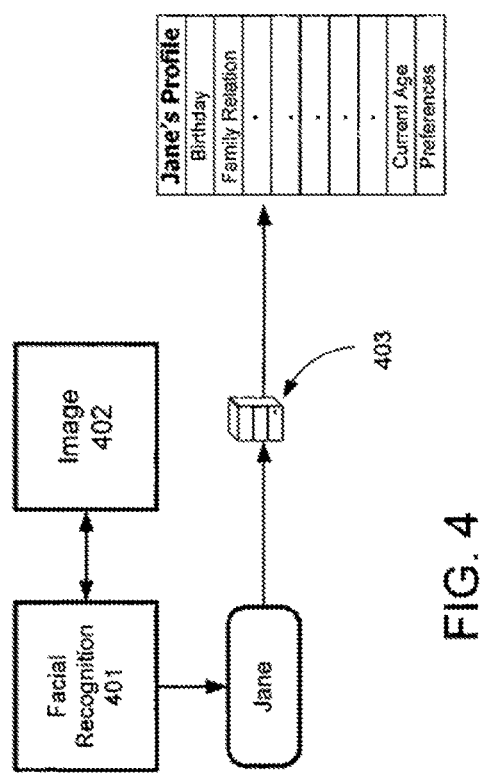
FIG. 4 illustrates associating a person's metadata profile with images.

Searching tool 201 may also include or cooperate with a facial recognition module. Facial recognition software is used to identify people depicted in images. Once trained, the facial recognition software analyzes images to see whether it can identify people depicted therein. Names of depicted people can be indexed and associated with the image. Or individual profiles (name, birth date, family relation, etc.) can be established and associated with a person. Then, when the facial recognition software identifies an individual, the individual's profile is associated with the image as metadata. (FIG. 4 shows one example of this method. Facial recognition software 401 analyzes an image 402 and determines that the image depicts Jane. A profile database 403 is interrogated to obtain Jane's profile 404 (e.g., name, current age, birth date, etc.) and the profile 404 is associated with the image as metadata.)

Metadata can also be generated by searching devices within a user's home domain. For example, the searching tool 201 initiates communication (e.g., via Bluetooth or wireless connection) with the user's cell phone, which is equipped with a camera and GPS unit. The searching tool 201 queries where the camera has taken pictures. The geolocations and times of image capture can be used as metadata or to find metadata. Instead of querying the cell phone or other camera, the searching tool might talk with a user's TiVo device, game console (e.g., Xbox or PlayStation), music player (e.g., an iPod or MP3 player) or PDA. Relevant information (e.g., journals, calendars, other images, music, video games, etc.) gathered from these sources can be used as metadata for a particular file on the user's desktop.

User Selection

The searching tool 201 (FIG. 2) preferably includes one or more user interfaces (e.g., as provided by tool 204)

through which a user can interact with the tool 201 and metadata found or indexed by the tool 201.

For example, a user is preferably able to select, through desktop searching tool 204, internet-based sites at which searching tool 201 is likely to find additional metadata. (The user can type in URLs or highlight predetermined metadata websites.) The user can also preferably set one or more filters through such interfaces. A "filter" is a software module or process that limits or screens information that should be used as metadata. Filters allow a user to weed out potentially meaningless metadata. For example, one filter option allows for only metadata gathered from the user's desktop to be associated with an image. Another option allows a user to set preferred or trusted metadata sources. Metadata gathered from repository 210 might be designated as being trusted, but metadata gathered from an automatic internet search of text found in an image header might not be trusted. A related filter option allows a user to pre-rank metadata based on source of the metadata. If the metadata is not of a sufficient rank, an image file is not augmented to include the new metadata and the low-ranking metadata is not indexed. Yet another filter option allows for only metadata approved by a user to be associated with an image.

Figure 5:
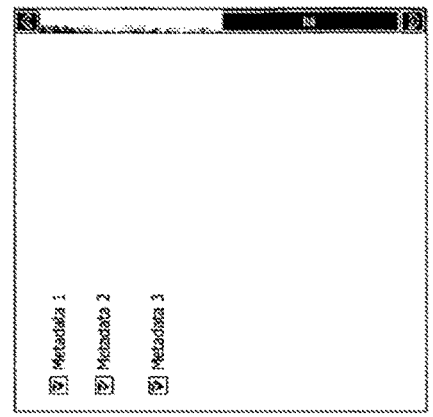
FIG. 5 illustrates a graphical user interface for selecting automatically gathered or generated metadata.

Gathered or generated metadata is preferably presented through an interface for the user's review and approval. For example, metadata is presented via a graphical window complete with check-boxes (see FIG. 5). A user simply checks the metadata she would like associated with an image and the searching tool 201 updates the metadata portion of an image file to reflect the user's selections. Instead of checkboxes a user can highlight metadata she wants to keep.

Directory View

Another feature of the present invention is a directory view. Files are often arranged and graphically displayed by directories and folders. (Just click on "My Documents" in your computer directory and see how the files are arranged therein.)

An improvement arranges and graphically displays files according to their metadata. For example, based on information gathered by searching tool 201, images arranged and graphically displayed on a computer display according to metadata associated therewith. The metadata categories can change based on user preference, but we provide a few examples below.

A user selects three broad metadata categories, vacations, professional and family.

A program (or operating system) queries an index provided by searching tool 201. All images including metadata identifying them as a "vacation" image are associated with the vacations directory, and all images including metadata identifying them as "family" are associated with the family directory.

The user can change the "file directory" view by changing the metadata categories. The user can also establish subdirectories as well (e.g., Disneyland and Niagara Falls metadata displays within the vacation directory).

Image are arranged and displayed in a metadata structure and not in a typical directory tree fashion. If a user changes the metadata request, the desktop arrangement is altered as well.

Visual presentation of a directory view can also be changed, e.g., according to a style sheet associated with a particular type of metadata or media. Style sheets can vary from family member to family member (or between Windows login profiles). Music can also be represented according to its content. For example, music with a particular rhythm or harmony can be presented uniquely or according to a style sheet, etc.

One of the many possible combinations of the above file directory includes:

D1. A graphical user interface, stored and running on a computer, comprising:
    a first module to present a graphical representation of files through a computer display;
    a second module to determine metadata associated with each of the files for display;
    a third module to graphically organize the files for display according to their metadata.

Metadata Authoring

Figure 6:
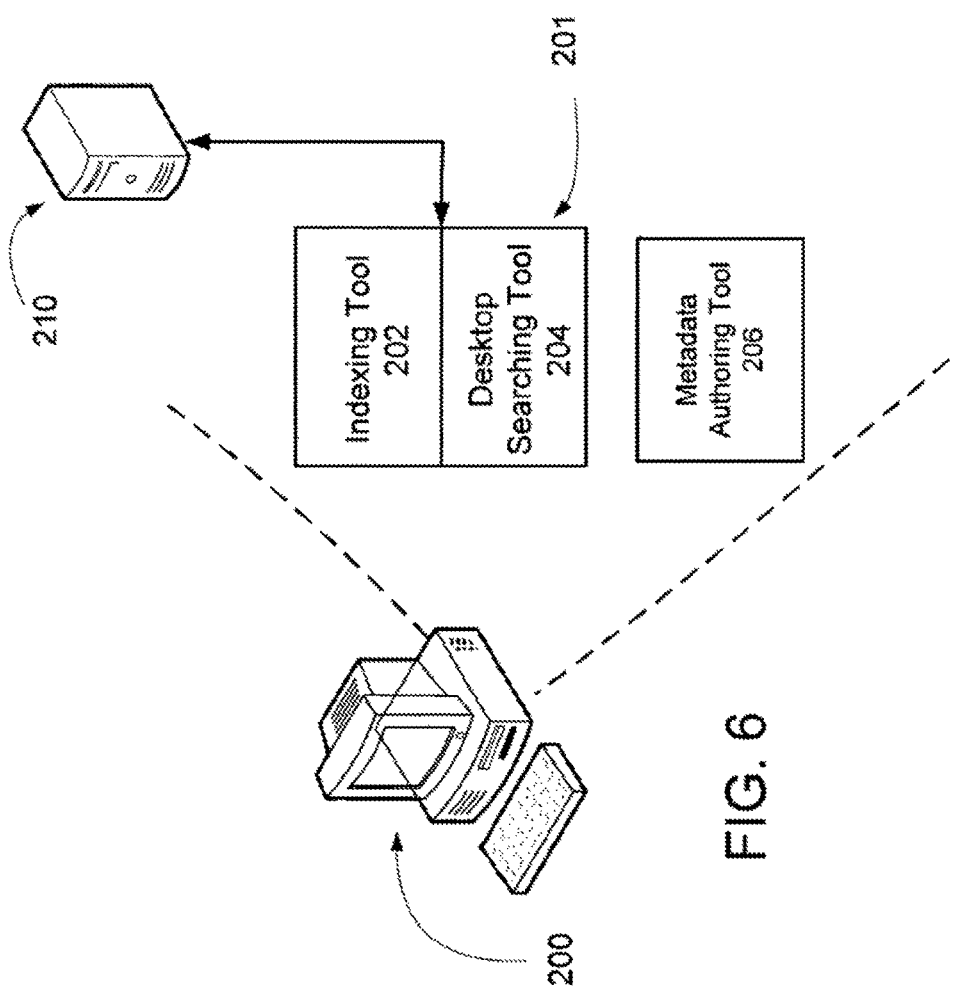
FIG. 6 illustrates a metadata authoring tool on a user's desktop.

A metadata authoring tool 206 (e.g., a software application) is described with reference to FIG. 6. The authoring tool 206 allows a user to annotate and associate metadata with multimedia content. While most image editing software (e.g., Digital Image Suite from Microsoft) provides metadata authoring capabilities, we provide a few improvements herein.

One improvement is the ability to "paint" an image or group or images with predetermined metadata. For example, in a software application setting, we provide a metadata toolbar that provides different metadata choices, e.g., terms like "vacation," "family," or profiles ("Jane's individual profile"), etc. Selecting (clicking) a metadata category from the metadata toolbar enables us to paint an image or file directory with the metadata. (One can imagine that the metadata selection makes the mouse cursor appear as a paintbrush. We then literally "paint" an image with the selected metadata. The image or directory icon representation (or thumbnail) can even turn a color associated with the metadata to provide user feedback that the metadata has been attached to the image.) Behind the scenes, the user selection of metadata and a target image tell the authoring tool 206 which metadata is to be added to a metadata portion of an image file. The metadata portion is rewritten or added to to reflect the "painting."

Even More Desktop Searching

Returning to the topic of desktop searching, in another implementation, we provide an image (and/or audio and video) searching tool (e.g., a computer program written in C++). The image searching tool resides on a user's device (e.g., computer, network server, iPod, cell phone, etc.) and crawls though files and folders in search of images. For example, the searching tool searches for image files, e.g., as identified by their file extensions *.gif, *.jpg, *.bmp, *.tif, etc. (If searching for audio or video files, we might search for *.au, *.wmv, *.mpg, *.aac, *.mp3, *.swf, etc.). In another example, a user (or operating system) identifies image directories and the searching tool combs through each of these identified directories.

Figure 7:
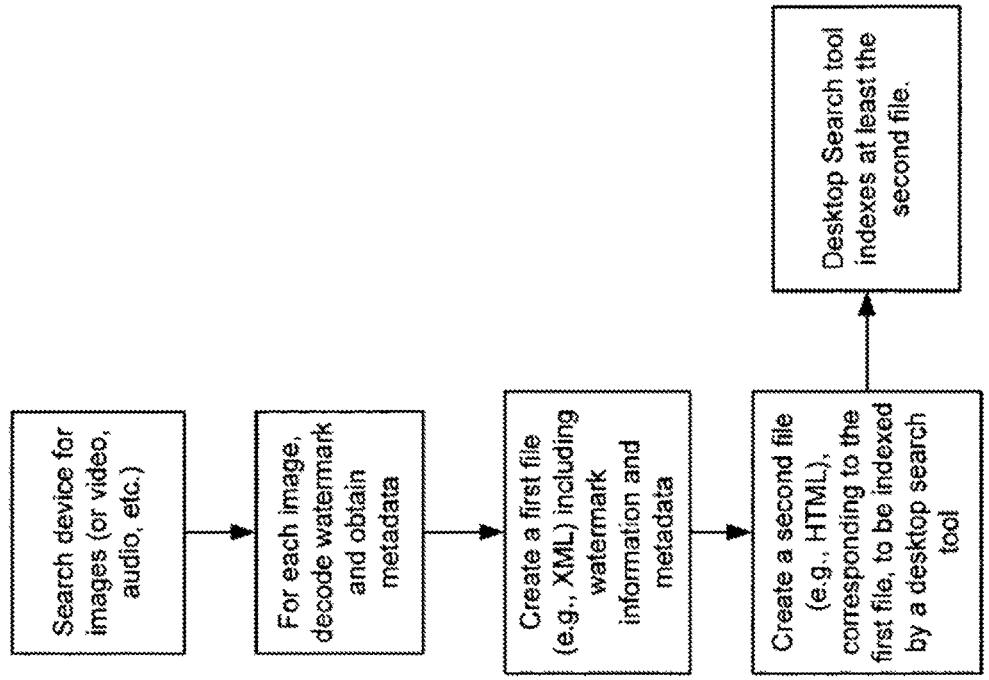
FIG. 7 is a flow diagram illustrating a desktop indexing method according to yet another aspect of the invention.

Once identified, and with reference to FIG. 7, the searching tool opens an image and searches the image for an embedded digital watermark. The searching tool may include or call a watermark detector. If found, the watermark information (e.g., plural-bit payload) is provided to or is included in a first file, e.g., an XML file. The first file preferably includes the same file name, but has a different file extension. The image is further evaluated to obtain metadata there from (e.g., EXIF information, header information or other metadata). The metadata is provided to or is included in the first file. The first file may include the same tags or identifiers as were originally included in the image (or audio or video).

Upon encountering a digital watermark, the searching tool may query one or more online metadata repositories to determine whether there exists additional metadata associated with the image. Such online metadata may be downloaded to the first file. Of course, filters or criteria may be used to restrict which online metadata is accepted. For example, only those packets or groupings of metadata that are signed by a trusted or recognized source may be accepted for inclusion in the first file. Or different metadata fields or tags can include a last modified or time stamp indicator. That way, if the online-metadata includes a redundant field or tag, the most recent version (either associated with the image or online) of the metadata is used. Still further, a user can specify which sources of metadata should be trusted and included.

A watermark identifier can also facilitate "bi-directional" metadata population. That is, a watermark identifier can link to an online repository of metadata, and in particular, to a particular image or associated metadata. Metadata can be uploaded to the online repository and associated with the image metadata via the watermark identifier. (Watermark-based network navigation is discussed, e.g., in assignee's U.S. patent application Ser. No. 09/571,422, mentioned above.)

Returning to FIG. 7, a second file (e.g., HTML) is created. The second file name preferably includes the same file name as the first file and image, but with a different file extension. The second file preferably includes information from the first file. For example, if the first file includes a storage location for the image, the second file may include a hyperlink to the image (based on the storage location). As discussed in some of the implementations above, the second file may also include a representation of the image, or if video or audio, perhaps a sample or snippet of the audio or video. The second file can be configured by a user to include some or all of the information from the first file. This is advantageous, e.g., if the user wants to limit viewing of camera settings. (Behind the scenes, an XML parser cooperating with a style sheet or "skin" can be used to interpret the first file and populate the second file in accordance with the style sheet. In other implementations underlying content itself is used to determine how to populate a second file. Audio content having a certain rhythm or melody is displayed according to a first predetermined style, while content having other characteristics are displayed according to a second, different style.)

The creation of the HTML file typically triggers indexing by a desktop searching tool (e.g., Google or Yahoo, etc.). The metadata is added to an index, effectively allowing searching of the image. In some implementations, of course, the functionality of the above search tool is integrated with the desktop searching tool. In other implementations, the searching tool plugs-in with the desktop searching tool. In still other implementation, a searching tool cooperates (or operates from) a proxy server or network hub.

(We note here that some desktop searching tools, such as Google's Desktop Searching tool allows for registering of certain file "types" (e.g., JPEG, etc.). The first file mentioned above can be given a unique file extension (or type). That way, a desktop searching tool can be told to ignore the first file when indexing so as to avoid redundant results.)

The image searching tool can compare a "Last modified" date to determine whether to index a particular image. For example, an image's last modified date can be compared to a last modified date of a corresponding first file. If the image's modification date is later than the first files, the image is again analyzed to obtain the watermark and metadata. The first file is updated, along with the corresponding second file.

Blogs

Watermarks can also be used to facilitate and link to so-called on-line blogs. (A blog is information that is published to a web site. So-called "blog scripting" allows someone to post information to a Web site.)

Consider a photo (or audio or video) that includes a digital watermark embedded therein. A watermark reader extracts the watermark and links to an on-line resource (e.g., a URL). An improvement is that the digital watermark links to a blog or blog thread (or conversation). The blog may be stored, e.g., as a file. Consider that the watermark includes or references a URL of an online photo blog site, e.g., akin to Flickr (see, e.g., www.flickr.com). The watermark can link to a specific picture or account at flicker, and perhaps even a particular blog thread. For example, consider a photo depicting a home office, complete with a computer, monitor and chair. There may be several different blog threads (or conversations) being posted about the items depicted. (Maybe someone likes the chair, and wonders whether it will provide sufficient lumbar support. A conversation or thread continues on this topic.) A watermark—perhaps representing an image region that depicts the chair, or that is otherwise linked to the chair or thread—is used to link to the particular thread. A separate watermark (or watermark component) can be embedded in the image to represent a particular thread. The watermark payload or component information may even include an identifier that will link to subject matter line—displayable to a user—to allow user's to pick which blog thread they would like to consider. If the photo contains multiple such watermarks, each of the corresponding subject matter lines can be displayed for selection. Thus, the watermark becomes the root of each blog and blog thread. (Perhaps as a prerequisite to starting a blog thread, the conversation is assigned a watermark identifier or component, and the component is embedded in the image—perhaps region specific—when the blog or response is posted.)

In other implementations, each person who comments to a blog is assigned an identifier (or even a particular, unique watermark signature). The person's watermark is embedded in the image when they blog or otherwise comment on the photo.

More on Blogs

At their roots, "photoblogs" are simply blogs with pictures. In most cases the pictures are the anchors. They grab attention, set tone and act as bookmarks. (See, e.g., www-.photoblog.org).

So, on the one hand you can simply post an image as part of a log on the web, providing humor, illustration, documentation or an anchor for a conversation. The conversation could be about a vacation location, person, children, family, places or anything else topical and photogenic.

Digital watermarking brings a new twist with improvements. Watermarking makes the photo the centerpiece of a photoblog. A watermarked photo becomes an agent to the blog and a portal that can be revisited repeatedly. The photo could be distributed as a pointer to the blog itself. The photo catches the attention of the recipient, and through the digital watermark links back to a blog server (or network resource at which the blog is hosted). One can imagine that the blog is hosted (e.g., you must go to the website to read) or downloadable (e.g., sort of like the good old newsgroup concept). By dragging and dropping the photo on a blogging client or other application, one adds the blog to the client or application. (Behind the scenes, a watermark detector reads a watermark identifier from the dragged-and-dropped photo. The watermark identifier is used to link to the on-line blog (or conversation). For example, the identifier is used to identifier a file storage location of the blog, or a network location hosting the blog (e.g., URL). The blog is obtained or downloaded to the location. In other cases, instead of downloading the entire blog, a link to the blog is stored at the application or client.)

Consider blog initiation. A user uploads an image to a blogging site to start a blog and writes a first entry. The site automatically watermarks the image with an identifier, linking the photo to the blog (or adding it to an existing blog). With the blog created, the user may (optionally) right-click, e.g., to send the image (and blog) to a friend. The e-mail including the watermarked photo invites friends to respond. They are linked to the original blog through the watermark identifier.

This functionality can be incorporated with desktop searching tools.

When a watermarked image is noticed by a desktop searching tool, that image is checked to see if there's an associated blog, e.g., by querying an on-line blog site associated with the watermark or evaluating a "blog-bit" carried by a watermark payload. (A watermark payload may include many fields, with one of them identifying or linking to a particular blogging site.). The desktop searching tool (or photo handling software including, Photoshop, web browser, etc.) preferably provides a user indication (e.g., "go to blog" link shows up). Viewers can navigate over to read the blog via the watermark identifier. The image becomes linked or "bookmarked" to the blogging thread.

A watermark reader or desktop searching tool can include a right-click feature that allows addition of a blog entry on bloggable images (a feature determined by the watermark). Thus an image may appear anywhere, on a home computer or cell phone, and act as a gateway to the blog for reading or adding to the blogging thread.

The basic association of a blog with an image can happen, e.g., when a photo is registered at a photo-repository or online site. The act of registering a photograph—or watermarking the photograph—can create a blog, and over time, provide a more generalized brokerage to any blog that is registered. Any image can be "bloggable". Over time, photographers can create blogs around their collection as a way of marketing or communicating. One can even imagine blogs that are private (e.g., password or biometric protected) as a means of interacting with a friend or client.

A watermark preferably survives into print, and thus a relationship is created between printed images and (photo) blogs. (In some implementations a blogs is not created until an image is printed. But in any case, watermarking adds power to print that passes through a watermarking step, giving it a unique identity.)

As a practical application a web-based user interface is created. A user presents a watermarked picture (or just a watermark identifier extracted from said picture) to the interface via the web. If receiving the picture the website extracts a watermark identifier there from. The watermark identifier is provided to a basebase or index to locate information associated therewith. For example, the picture was originally associated with one-or more text-based blogs. A current location of the blogs are found and provided to the user through the interface.

A few possible combinations of the above blogging implementations include:

E1. A method of associating a blog with media comprising:
embedding a digital watermark in an image or audio;
associating at least a portion of the digital watermark with a network-hosted blog.

E2. The method of E1, wherein the watermark comprises plural data fields, with at least one of the fields including or pointing to an on-line address at which the blog is hosted.

E3. The method of E1 wherein the blog comprises an on-line conversation.

E4. A method of associating an online blog with media comprising:
decoding a digital watermark from the media;
accessing an on-line repository associated with the watermark; and
accessing the blog associating with the media.

Even further combinations based on the present disclosure are provided below. Of course these are not the only possible combinations of this document and are provided by way of example.

F1. A desktop searching tool comprising:
executable instructions stored in computer memory for execution by electronic processing circuitry, said instructions comprising instructions to:
i. search one or more computer directories for imagery or audio files;
ii. upon discovery of an imagery or audio file, analyze the file for a digital watermark embedded therein, and if a digital watermark is embedded therein to, recover a plural-bit identifier;
iii. obtain metadata from the imagery or audio file; and
iv. query a remote database with the plural-bit identifier to determine whether the file metadata is current.

F2. The desktop searching tool of F1 further comprising instructions to refresh the file metadata with metadata from the remote database when the file metadata is not current.

F3. The desktop searching tool of F2 wherein a timestamp or last edited field is used to determine whether the file metadata is current.

F4. The desktop searching tool of F1 further comprising instructions to upload the imagery or audio file when the file is not stored on the remote database.

F5. The desktop searching tool of F1 further comprising instructions to generate a searchable index reflecting at least the metadata.

F6. The method of F1 further comprising generating a searchable index reflecting at least the metadata.

G1. A method of controlling a desktop searching tool comprising:
searching one or more computer directories for imagery or audio files;
upon discovery of an imagery or audio file, analyzing the file for a digital watermark embedded therein, and if a digital watermark is embedded therein, recovering a plural-bit identifier carried by the digital watermark;
obtaining metadata from the imagery or audio file; and
querying a remote database with the plural-bit identifier to determine whether the file metadata is current.

G2. The method of G1 further comprising refreshing the file metadata with metadata from the remote database when the file metadata is not current.

G3. The method of G1 wherein a timestamp or last edited field is used to determine whether the file metadata is current.

G4. The method of G1 further comprising uploading the imagery or audio file when the file is not stored in the remote database.

H1. A method of searching a network for watermarked content comprising:
  receiving one or more keywords associated with watermarked content;
  providing the one or more keywords to a network search engine;
  obtaining from the network search engine a listing of URLs that are associated with the one or more keywords;
  analyzing content at websites associated with the URLs for digital watermarking;
  obtaining at least one watermark identifier from the digital watermarking; and
  reporting at least one watermark identifier and a corresponding URL location.

H2. The method of H1, wherein the watermark identifier and URL location are reported to a remote server.

H3. The method of H1, wherein the watermark identifier and URL location are reported directly to a copyright owner associated with the watermark identifier.

H4. The method of H1, wherein the one or more keywords comprises a watermark indicator.

I1. A method of searching a network for watermarked content comprising:
  monitoring network traffic patterns associated with a network resource comprising watermarked content stored thereon;
  directing a watermark reader in a direction of the traffic patterns in search of watermarked content.

J1. A method of categorizing content by a search engine comprising:
  examining metadata associated with a website, the metadata reflecting a presence of digital watermarking; and
  providing a presence of digital watermarking indicator that is associated with the website, wherein the presence of digital watermarking indicator is searchable through the search engine.

K1. A method of obtaining metadata for a first imagery or audio file comprising:
  determining other imagery or audio files that were created within a predetermined window of a creation time for the first imagery or audio file;
  gathering metadata associated with the other imagery or audio files; and
  associating at least some of the metadata with the first imagery or audio file.

K2. The method of K1 wherein the other imagery or audio files comprise content portions and metadata portions, and said gathering comprises copying at least some of the metadata portions.

K3. The method of K2 further comprising presenting gathered metadata for user selection through a graphical user interface.

L1. A method of authoring metadata for an image or audio file or file directory via a computer comprising:
  providing a graphical user interface through which a user can select a category of metadata from a plurality of categories of metadata; and
  once selected, applying the selected category of metadata to a file or contents in a directory through a mouse cursor or touch screen, whereby the selected category of metadata is associated with the image or audio file or file directory.

L2. The method of L1 wherein the mouse cursor changes its graphical appearance when a category of metadata is selected.

L3. The method of L1 wherein a file changes color when the selected category of metadata is applied thereto.

Concluding Remarks

Having described and illustrated the principles of the technology with reference to specific implementations, it will be recognized that the technology can be implemented in many other, different, forms. To provide a comprehensive disclosure without unduly lengthening the specification, applicants hereby incorporates by reference each of the patent documents referenced above.

The methods, processes, components, modules, filters and systems described above may be implemented in hardware, software or a combination of hardware and software. For example, the watermark data encoding processes may be implemented in a programmable computer or a special purpose digital circuit. Similarly, watermark data decoding may be implemented in software, firmware, hardware, or combinations of software, firmware and hardware.

The methods, components and processes described above (e.g., desktop searching tools and metadata generation and gathering tools) may be implemented in software programs (e.g., C, C++, Visual Basic, Java, Python, Tcl, Perl, Scheme, Ruby, executable binary files, etc.) executed from a system's memory (e.g., a computer readable medium, such as an electronic, optical or magnetic storage device).

The section headings are provided for the reader's convenience. Features found under one heading can be combined with features found under another heading. The various example "combinations (e.g., C1, D1, etc.) are provided by way of example only. Of course, many other combinations are possible given the above detailed and enabling disclosure.

Our use of the term "desktop" should not be construed as being limiting. Indeed, our "desktop" searching modules and our metadata generation and gathering methods can be employed on laptops, handheld computing devices, personal (or digital) video recorders (e.g., think TiVo), cell phones, etc. We can even store our metadata index or searching tools on consumer electronic devices like MP3 players, iPods, TiVo devices, game consoles (e.g., XBox), etc.

The particular combinations of elements and features in the above-detailed embodiments are exemplary only; the interchanging and substitution of these teachings with other teachings in this and the incorporated-by-reference patents/applications are also contemplated.

What is claimed is:

1. A method comprising:
  searching one or more device directories for imagery or audio files;
  upon discovering an imagery or audio file, analyzing the imagery or audio file for a digital watermark embedded therein;
  recovering the digital watermark embedded in the imagery or audio file;
  obtaining metadata from the imagery or audio file, wherein the metadata is generated through image pattern recognition;
  creating a first file including watermark information and metadata from the digital watermark, wherein the watermark information and the metadata include an extensible markup language (XML) tag;
  indexing, using a computerized search tool, a second file comprising an HTML file, the second file created from the first file;
  receiving, from a user, one or more keywords associated with the digital watermark, wherein the one or more keywords represents a visible pattern;
  searching the indexed second file for content corresponding to the visible pattern;

identifying content that matches the visible pattern; and decoding, responsive to identifying content matches the visible pattern, using at least one electronic processor, the digital watermark steganographically encoded in visual or audio data samples of the content.

2. The method of claim 1, further comprising determining a reporting location.

3. The method of claim 2, wherein determining the reporting location comprises analyzing the decoded watermark to determine the reporting location, wherein the digital watermark comprises the reporting location.

4. The method of claim 1, further comprising determining the at least one electronic processor is inactive for a predetermined period of time, wherein the content is received after the at least one electronic processor is inactive for the predetermined period of time.

5. The method of claim 1, further comprising receiving a multimedia file associated with the digital watermark from a remote computing system.

6. The method of claim 5, wherein receiving the one or more keywords associated with the digital watermark comprises analyzing the multimedia file for metadata, wherein the metadata comprises the one or more keywords.

7. The method of claim 1, further comprising:

analyzing the content for metadata; and determining the metadata includes at least one of the one or more keywords, wherein the analyzing the content from the network locations for the digital watermark is done responsive to the determining the metadata includes at least one of the one or more keywords.

8. A system comprising:

one or more electronic processors having programmed instructions to:

search one or more device directories for imagery or audio files;

upon discovering an imagery or audio file, analyze the imagery or audio file for a digital watermark embedded therein;

recover the digital watermark embedded in the imagery or audio file;

obtain metadata from the imagery or audio file, wherein the metadata is generated through image pattern recognition;

create a first file including watermark information and metadata from the digital watermark, wherein the watermark information and the metadata include an extensible markup language (XML) tag;

index a second file comprising an HTML file, the second file created from the first file;

receive, from a user, one or more keywords associated with the digital watermark, wherein the one or more keywords represents a visible pattern;

search the indexed second file for content corresponding to the visible pattern;

identify content that matches the visible pattern; and decode, responsive to identifying content matches the visible pattern, using at least one electronic processor, the digital watermark steganographically encoded in visual or audio data samples of the content.

9. The system of claim 8, wherein the one or more processors determine a reporting location.

10. The system of claim 9, wherein to determine the reporting location the one or more processors analyze the decoded watermark to determine the reporting location, wherein the digital watermark comprises the reporting location.

11. The system of claim 8, wherein the one or more processors determine the at least one electronic processor is inactive for a predetermined period of time, wherein the content is received after the at least one electronic processor is inactive for the predetermined period of time.

12. The system of claim 8, wherein the one or more processors receive a multimedia file associated with the digital watermark from a remote computing system.

13. The system of claim 12, wherein the one or more processors analyze the multimedia file for metadata, wherein the metadata comprises the one or more keywords.

14. The system of claim 8, wherein the one or more processors further:

analyze the content for metadata; and determine the metadata includes at least one of the one or more keywords, wherein the analyzing the content for the digital watermark is done responsive to the determining the metadata includes at least one of the one or more keywords.

15. A non-transitory computer-readable medium having instructions stored thereon, the instructions comprising:

instructions to search one or more device directories for imagery or audio files;

instructions to, upon discovering an imagery or audio file, analyze the imagery or audio file for a digital watermark embedded therein;

instructions to recover the digital watermark embedded in the imagery or audio file;

instructions to obtain metadata from the imagery or audio file, wherein the metadata is generated through image pattern recognition;

instructions to create a first file including watermark information and metadata from the digital watermark, wherein the watermark information and the metadata include an extensible markup language (XML) tag;

instructions to index, using a computerized search tool, a second file comprising an HTML file, the second file created from the first file;

instructions to receive, from a user, one or more keywords associated with the digital watermark, wherein the one or more keywords represents a visible pattern;

instructions to search the indexed second file for content corresponding to the visible pattern;

instructions to identify content that matches the visible pattern; and instructions to decode, responsive to identifying content matches the visible pattern, using at least one electronic processor, the digital watermark steganographically encoded in visual or audio data samples of the content.

16. The non-transitory computer-readable medium of claim 15, wherein the instructions further comprise instructions to determine a reporting location.

17. The non-transitory computer-readable medium of claim 16, wherein the instructions to determine the reporting location further comprise instructions to analyze the decoded watermark to determine the reporting location, wherein the digital watermark comprises the reporting location.

18. The non-transitory computer-readable medium of claim 15, wherein the instructions further comprise instructions to determine the at least one electronic processor is inactive for a predetermined period of time, wherein the content is received from the network locations after the at least one electronic processor is inactive for the predetermined period of time.

* * * * *